United States Patent [19]
Diehl

[11] 3,712,151
[45] Jan. 23, 1973

[54] MINIATURE DETENT MECHANISM
[75] Inventor: Norman R. Diehl, Erie, N.Y.
[73] Assignee: GTE Sylvania Incorporated
[22] Filed: June 1, 1971
[21] Appl. No.: 148,782

[52] U.S. Cl. ................................................74/527
[51] Int. Cl. ..............................................G05g 5/06
[58] Field of Search....................74/527; 200/166 D

[56] References Cited

UNITED STATES PATENTS 2,638,015   5/1953   Schoelles............................74/527 X
3,165,936   1/1965   Daugherty..........................74/527 X
3,293,382   12/1966   Lewandowski et al. ............74/527 X Primary Examiner—Milton Kaufman
Attorney—Norman J. O'Malley, Elmer J. Nealon and Robert T. Orner

[57] ABSTRACT

A miniature detent mechanism employs a rotatable shaft having a plurality of longitudinal serrations located on the periphery thereof. A housing including two balls and a ball race is positioned around the shaft in the area of the longitudinal serrations. A leaf style spring formed around the ball race exerts an inward force on the balls seating them into the shaft serrations whereby the shaft is detented in various radial positions.

3 Claims, 7 Drawing Figures

PATENTED JAN 23 1973
3,712,151
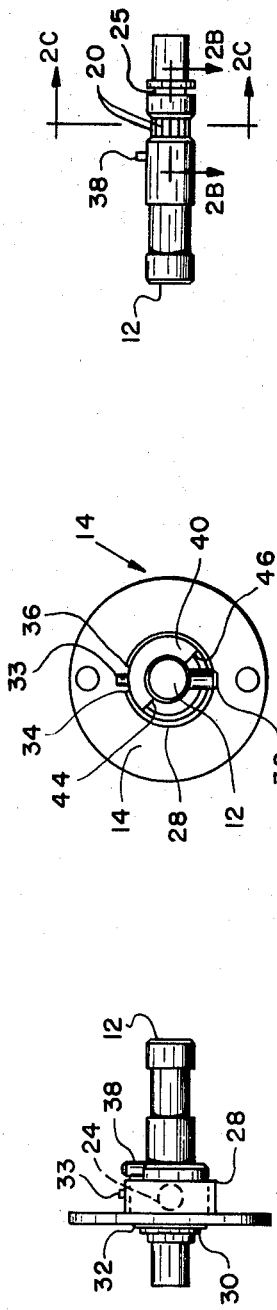
INVENTOR.
NORMAN R. DIEHL
BY Robert T. Orner
ATTORNEY

MINIATURE DETENT MECHANISM

BACKGROUND OF THE INVENTION

This invention relates to detent mechanisms and in particular to a miniature detent mechanism useful in a rotatable switching device in which discrete switch positions are desired.

In small portable electronic devices, such as a small hand-held rescue radio employing a plurality of radio channels and functions, there is a requirement for a miniature switch which has discrete positions corresponding to each channel and/or function. Existing detents or indexing mechanisms are generally too large and bulky. For example, standard mechanisms have a ball retainer fixed to a rotating shaft, a plurality of indexing cams located in a housing surrounding the shaft and ball retainer. Helical springs exert longitudinal force on the balls, seating them in detents within the base of the housing. Separate shaft alignment bearings and load bearings are required to center the rotating shaft within the housing.

It would therefore be advantageous to have and it is one of the objects of this invention to provide a miniature detent mechanism employing a simple design for obtaining shaft alignment and discrete shaft positions.

SUMMARY OF THE INVENTION

A miniature detent mechanism according to the present invention includes a shaft having a plurality of slots located radially about the shaft at a predetermined longitudinal position so as to form a ring of longitudinal serrations about the shaft and a housing member including a cylindrical inner wall defining a first opening therein and having second and third openings within the inner wall. The shaft is positioned within the cylindrical wall such that certain ones of the slots on the shaft are in line with second and third openings of the housing member.

Bearings are positioned in the second and third openings of the housing member and extend into the slots on the shaft that are in line with the openings. A biasing means is coupled to the bearing means forcing the bearing means toward the shaft whereby, when the shaft is rotated within the housing member, the bearing means rides in and out the slots on the shaft to provide the desired detent mechanism.

DESCRIPTION OF THE DRAWINGS

A miniature detent mechanism according to the present invention will be more fully understood from the following detailed description taken in conjunction with the accompanying drawings wherein:

FIGS. 1A through 1C are side, top and sectional views, respectively, of one embodiment of a miniature detent mechanism according to the present invention;

FIGS. 2A through 2C are side, expanded longitudinal and expanded cross-sectional views, respectively, of a rotatable shaft employed in the embodiment of FIGS. 1A through 1C; and FIG. 3 is a perspective view of a housing member employed in the embodiment of FIGS. 1A through 1C.

DETAILED DESCRIPTION OF THE INVENTION

An embodiment of a detent mechanism 10 according to the present invention, shown in a side view, top view and sectional side view in FIGS. 1A, 1B and 1C respectively, includes a shaft 12 positioned within a housing member 14. The housing member 14 has a cylindrical inner surface 16, the diameter of which is slightly larger than the diameter of the shaft 12. The contact between the surface of the inner wall 16 and the outer surface of shaft 12 maintains a coaxial alignment between the housing member 14 and the shaft 12.

Shown in FIG. 2A is a more detailed drawing of the shaft 12 with expanded views of portions of the shaft 12 shown in FIGS. 2B and 2C. The shaft 12 includes a plurality of slots 20 located on the periphery of the shaft so as to form a radial collection of serrations 22 on the shaft 12. An exploded cross-sectional view of the serrated area of shaft 12 is shown in FIG. 2C while an expanded longitudinal sectioned view of slot 20 is shown in FIG. 2B. As shown in FIG. 2A, the shaft also has a circumferential channel 25, the purpose of which will be explained hereinafter.

The housing member 14, a perspective view of which is shown in FIG. 3, includes a pair of diametrically opposite holes 24 located in the walls 16 of the housing 14. Positioned in each hole 24 is a ball bearing 26 (FIG. 1C) that protrudes through the inner surface of the wall 16 into the particular slot 20 on the shaft 12 that is in line with the hole 24. A leaf style spring 28 is formed around the housing member 14 and exerts an inward force on the bearings 26 seating them into the slots 20. As the shaft 12 is rotated with respect to the housing 14, the bearings 26 ride up and over the edges of the serrations 22 into the next pair of slots thus providing a detent mechanism.

As the bearings 26 ride up the serrations 22, they exert a force against the inwardly biasing spring 28 causing it to expand. During expansion, the distance between the two edges 34 and 36 (FIG. 1B) of the spring 28 increases. A pin 33 is fixedly mounted in the housing member 14 between the edges 34 and 36 of the spring 28 to prevent rotation of the spring 38. It is to be noted that the wall 16 of the house member 14 doubles as a shaft bearing and as a bearing race.

To prevent longitudinal travel of the shaft 12 with respect to the housing member 14, the inside edge of a clip spring 30 is located in the circumferential channel 24 on the shaft 12. A flat washer 32 is sandwiched between the spring 30 and one surface of the housing member 14 to facilitate rotation. A second pin 38 is inserted into shaft 12 at the other surface of the housing member 14 to prevent longitudinal travel in that direction.

When the detent mechanism 10 is used in conjunction with a selector switch, there may be a requirement to limit the travel of the switch. The rotation of the shaft 12 can be limited by including a shoulder 40 on the edge of the housing member 14 associated with the pin 38. The shoulder 40 is, for example, shaped like a segment of a ring, the ends 44 and 46 of which become limit stops for the pin 38.

While there has been shown and described what is considered a preferred embodiment of the present invention, various modifications and changes may be made therein without departing from the invention as defined in the appended claims.

What is claimed is:

1. A detent mechanism comprising:

a shaft having a plurality of slots located radially about said shaft at a predetermined longitudinal position so as to form a ring of serrations about said shaft;

a housing member including a cylindrical inner wall defining a first opening therein and including second and third openings in said inner wall substantially orthogonal to said first opening;

said shaft being positioned within said cylindrical wall such that certain ones of the slots of said shaft are in line with the second and third openings of said housing member;

bearing means positioned in the second and third openings of said housing member and extending into said certain slots of said shaft that are opposite said second and third openings;

means for biasing said bearing means in a direction toward said shaft whereby when said shaft is rotated within said housing member said bearing means rides in and out of said slots over said serrations; and means for maintaining the relative longitudinal positions of said shaft and said housing member; wherein:

said shaft further includes a circumferential channel located on one side of said predetermined longitudinal position and an opening substantially orthogonal to the longitudinal axis of said shaft located at the other side of said predetermined longitudinal location; and said means for maintaining includes
- a clip spring having a circular inner surface, the thickness of which is slightly less than the width of said circumferential channel, said clip spring being positioned in said circumferential channel to thereby limit the longitudinal travel of the shaft in one direction, and
- a pin positioned in the opening on said shaft at the other end of said housing member to thereby limit the longitudinal travel in the other direction.

2. A detent mechanism according to claim 1 wherein said housing member further includes a shoulder extending around a predetermined portion of said first opening at the end of the housing member associated with said pin, said shoulder extending longitudinally beyond said pin such that the rotational travel of said shaft within said housing member is limited by said pin striking said shoulder.

3. A detent mechanism comprising:

a shaft having a section of substantially uniform diameter and having a plurality of slots located radially about said shaft at a predetermined longitudinal position of said section so as to form a ring of serrations about said shaft;

a housing member including a cylindrical inner wall defining a first opening therein having a diameter slightly larger than the diameter of said section of the shaft and including second and third openings in said inner wall substantially orthogonal to said first opening;

said shaft being positioned within said cylindrical wall such that said section of the shaft rotates within said first opening and the shaft is maintained coaxially aligned therewith and such that certain ones of the slots of said shaft are in line with the second and third openings of said housing member;

ball bearings having a diameter less than the size of the second and third openings and greater than the thickness of the wall of said housing member;

said ball bearings being positioned in the second and third openings of said housing member and extending into said certain slots of said shaft that are opposite said second and third openings; and a circular leaf spring expanded around the wall of said housing member and said ball bearings to produce a radially inward force on said ball bearings toward said shaft whereby when said shaft is rotated within said housing member said ball bearings ride in and out of said slots over said serrations.

* * * * *